(12) United States Patent
Xia et al.

(10) Patent No.: US 11,722,916 B2
(45) Date of Patent: Aug. 8, 2023

(54) SYSTEM AND METHOD FOR POWER SAVING IN DISCONTINUOUS RECEPTION OPERATION

(71) Applicant: Huawei Technologies Co., Ltd., Shenzhen (CN)

(72) Inventors: Pengfei Xia, San Diego, CA (US); Young Hoon Kwon, Laguna Niguel, CA (US); Bin Liu, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/259,101

(22) PCT Filed: Sep. 24, 2018

(86) PCT No.: PCT/US2018/052355
§ 371 (c)(1),
(2) Date: Jan. 8, 2021

(87) PCT Pub. No.: WO2020/013873
PCT Pub. Date: Jan. 16, 2020

(65) Prior Publication Data
US 2021/0329480 A1    Oct. 21, 2021

Related U.S. Application Data

(60) Provisional application No. 62/729,691, filed on Sep. 11, 2018, provisional application No. 62/697,056, filed on Jul. 12, 2018.

(51) Int. Cl.
*H04W 24/08* (2009.01)
*H04W 76/28* (2018.01)

(52) U.S. Cl.
CPC .......... *H04W 24/08* (2013.01); *H04W 76/28* (2018.02)

(58) Field of Classification Search
CPC . H04W 24/08; H04W 76/28; H04W 52/0229; H04W 52/0245; H04W 16/28; H04W 52/0216; Y02D 30/70; H04L 5/0023; H04L 5/0051
See application file for complete search history.

(56) References Cited

U.S. PATENT DOCUMENTS

| | | | |
|---|---|---|---|
| 2015/0249972 A1 | 9/2015 | You et al. | |
| 2017/0202025 A1 | 7/2017 | Ouchi et al. | |
| 2017/0251518 A1 | 8/2017 | Agiwal et al. | |
| 2018/0167883 A1* | 6/2018 | Guo | H04B 7/0617 |
| 2018/0255607 A1* | 9/2018 | Nagaraja | H04W 16/28 |

FOREIGN PATENT DOCUMENTS

CN    107615854 A    1/2018

* cited by examiner

*Primary Examiner* — Ayanah S George
(74) *Attorney, Agent, or Firm* — Slater Matsil, LLP

(57) ABSTRACT

A computer-implemented method includes sending, by an access node, to a user equipment (UE) configuration information for a beam quality reference signal (BQRS) that is associated with a discontinuous reception (DRX)-ON period used for sending a physical downlink control channel (PDCCH) to the UE, wherein the BQRS has a spatial quasi-collocated (QCL) relationship with either the PDCCH or a demodulation reference signal (DMRS) of the PDCCH. The method further includes sending, by the access node, the BQRS to the UE.

29 Claims, 8 Drawing Sheets

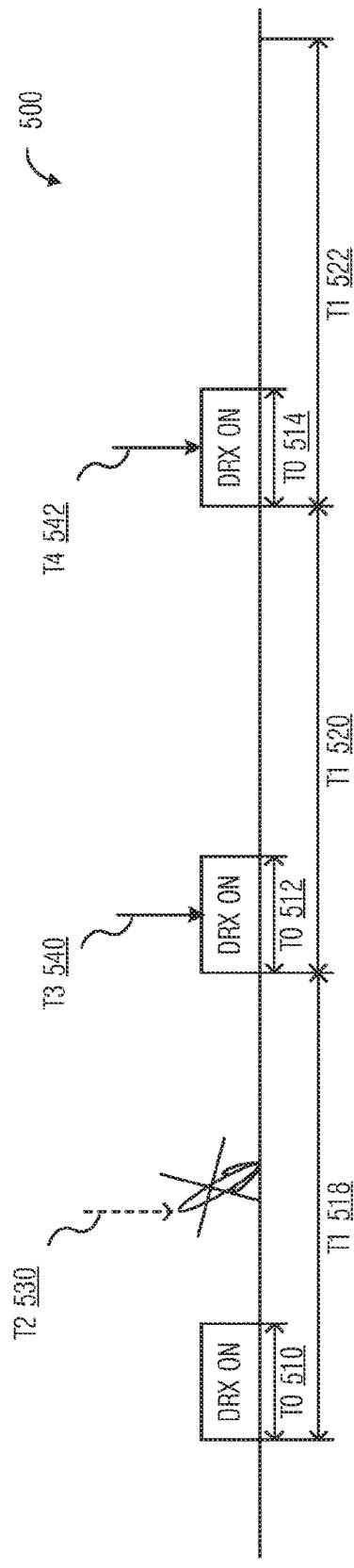
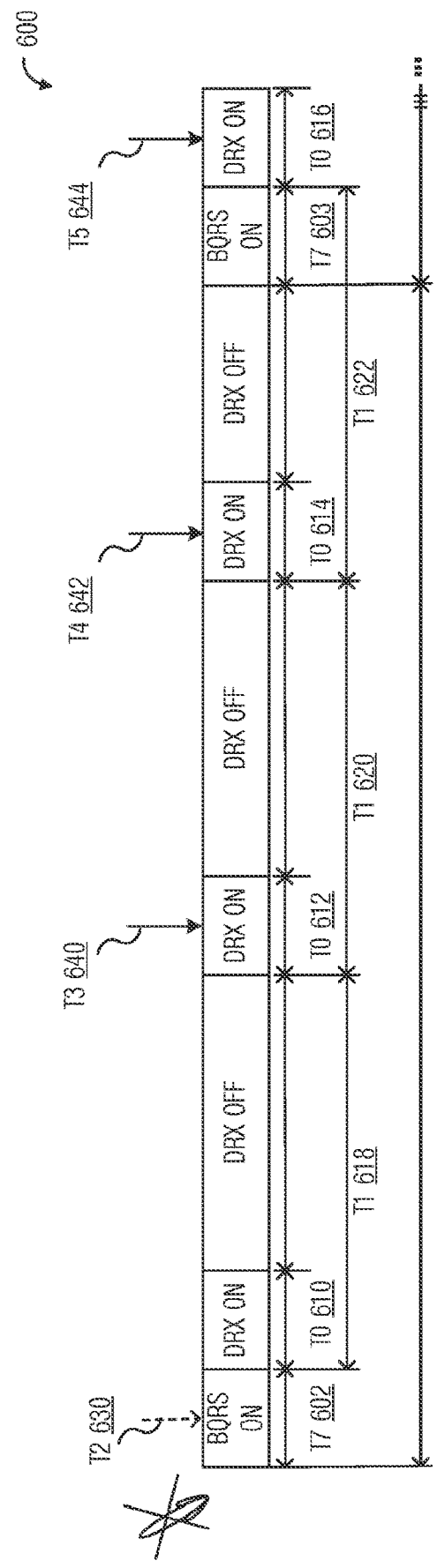

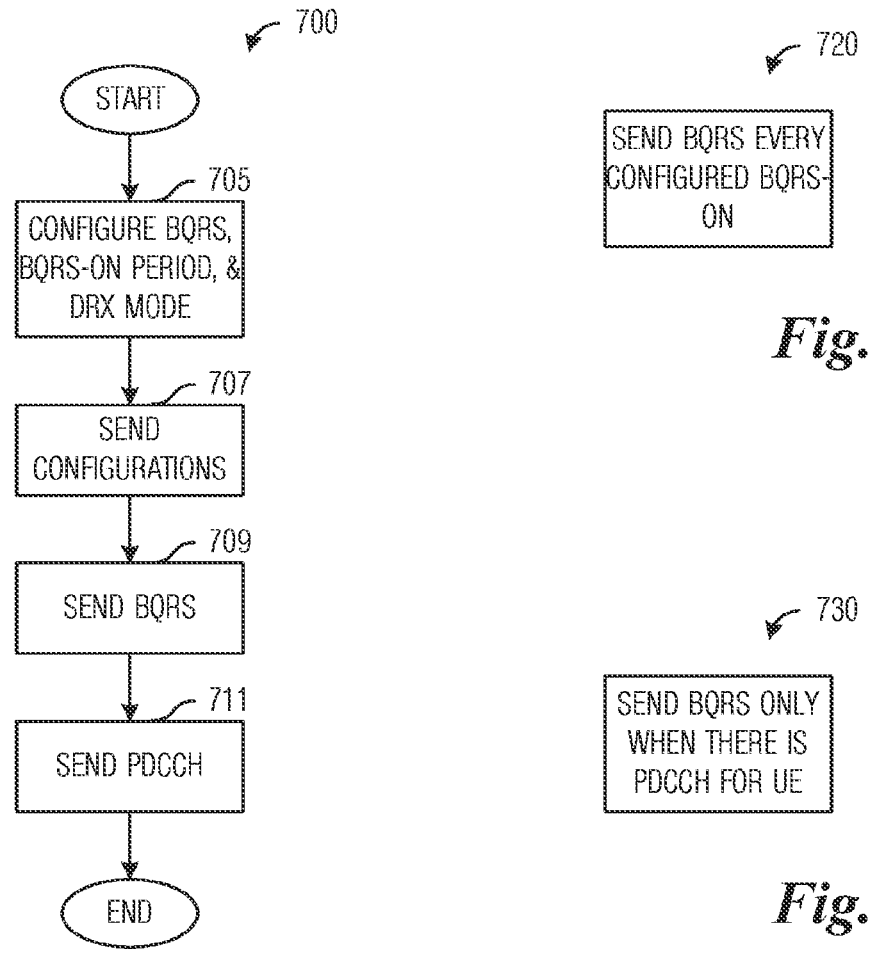

SYSTEM AND METHOD FOR POWER SAVING IN DISCONTINUOUS RECEPTION OPERATION

CROSS-REFERENCE TO RELATED APPLICATIONS

This patent application is a national phase filing under section 371 of PCT/US2018/052355, filed Sep. 24, 2018, which claims the benefit of U.S. Provisional Application No. 62/697,056, entitled "System and Method for Power Saving in Discontinuous Reception Operation," filed on Jul. 12, 2018, and claims the benefit of U.S. Provisional Application No. 62/729,691, entitled "System and Method for Power Saving in Discontinuous Reception Operation," filed on Sep. 11, 2018, both of which applications are hereby incorporated herein by reference in their entireties.

TECHNICAL FIELD

The present disclosure relates generally to a system and method for digital communications, and, in particular embodiments, to a system and method for power saving in discontinuous reception (DRX) operation.

BACKGROUND

Discontinuous reception (DRX) operation is a technique used to help improve power savings in wireless communications devices. DRX operation comprises two of time periods: DRX-on and DRX-off. In a DRX-on period, a wireless communications device is actively detecting for signals intended for the wireless communications device, while in a DRX-off period, there are no signals intended for the wireless communications device and the wireless communications device can enter a power saving mode (the power saving mode is commonly referred to as a sleep mode, a sleep state, a reduced power mode, and so on), consuming very little power.

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss. However, the beams are prone to blockage. Therefore, a beam that is being used for communications may become blocked and fail, leaving the communications device without a connection.

Due to the fragile nature of the beams used for communications in 5G NR communications systems, it is possible that a beam used by the wireless communications device to communicate during a previous DRX-on period to have become blocked, failed, or otherwise broken. In this situation, it is not guaranteed that the wireless communications device will be able to receive signals intended for it when it wakes up and enters a DRX-on period. Therefore, there is a need for systems and methods for power savings in DRX operation.

SUMMARY

According to a first aspect, a computer-implemented method for operating an access node is provided. The computer-implemented method includes sending, by the access node, to a user equipment (UE) configuration information for a beam quality reference signal (BQRS) that is associated with a discontinuous reception (DRX)-ON period used for sending a physical downlink control channel (PDCCH) to the UE, wherein the BQRS has a spatial quasi-collocated (QCL) relationship with either the PDCCH or a demodulation reference signal (DMRS) of the PDCCH, and sending, by the access node, the BQRS to the UE.

In a first implementation form of the method according to the first aspect as such, there are multiple BQRSs, and wherein each of the multiple BQRSs is sent during a BQRS-ON period.

In a second implementation form of the method according to the first aspect as such or any preceding implementation form of the first aspect, the BQRS is a UE-specific reference signal or a cell-specific reference signal.

In a third implementation form of the method according to the first aspect as such or any preceding implementation form of the first aspect, the BQRS is sent in a BQRS-ON period when the PDCCH is also sent to the UE in an associated DRX-ON period.

In a fourth implementation form of the method according to the first aspect as such or any preceding implementation form of the first aspect, the PDCCH is sent to the UE within a specified number of DRX-ON periods after the BQRS is sent to the UE.

In a fifth implementation form of the method according to the first aspect as such or any preceding implementation form of the first aspect, an embodiment wherein the BQRS includes a PDCCH indicator indicating if the PDCCH is sent to the UE in an associated DRX-ON period.

In a sixth implementation form of the method according to the first aspect as such or any preceding implementation form of the first aspect, sending the BQRS includes determining, by the access node, that no PDCCH is to be sent to the UE in the associated DRX-ON period, and based thereon sending, by the access node, a first BQRS to the UE, wherein the first BQRS is spatially QCL'ed with the PDCCH, had the PDCCH been sent to the UE in the associated DRX-ON period.

In a seventh implementation form of the method according to the first aspect as such or any preceding implementation form of the first aspect, sending the BQRS includes determining, by the access node, that the PDCCH is to be sent to the UE in the associated DRX-ON period, and based thereon sending, by the access node, a second BQRS to the UE, wherein the second BQRS is spatially QCL'ed with the PDCCH to be sent to the UE in the associated DRX-ON period.

In an eighth implementation form of the method according to the first aspect as such or any preceding implementation form of the first aspect, there are multiple DRX-ON periods during which the PDCCH is sent to the UE, wherein the BQRS is transmitted during a BQRS-ON period, and wherein the BQRS-ON period is disjoint from the multiple DRX-ON periods.

In a ninth implementation form of the method according to the first aspect as such or any preceding implementation form of the first aspect, the BQRS-ON period and the multiple DRX-ON periods are disjoint when there is no time shared between the BQRS-ON period and the multiple DRX-ON periods.

In a tenth implementation form of the method according to the first aspect as such or any preceding implementation form of the first aspect, the BQRS is associated with at least one DRX-ON period.

In an eleventh implementation form of the method according to the first aspect as such or any preceding implementation form of the first aspect, BQRS is associated with at most one DRX-ON period.

In a twelfth implementation form of the method according to the first aspect as such or any preceding implementation form of the first aspect, there are multiple DRX-ON periods during which the PDCCH is sent to the UE, wherein the BQRS is transmitted during a BQRS-ON period, and wherein the BQRS-ON period overlaps at least one DRX-ON period.

In a thirteenth implementation form of the method according to the first aspect as such or any preceding implementation form of the first aspect, the BQRS comprises at least one of a synchronization signal block (SSB), a channel state information reference signal (CSI-RS), a DMRS, a discontinuous reference signal (DRS), or a reference signal dedicated for BQRS mode operation.

According to a second aspect, a computer-implemented method for operating a UE is provided. The computer-implemented method includes receiving, by the UE, configuration information for a BQRS that is associated with a DRX-ON period used for receiving a PDCCH sent to the UE, wherein the BQRS has a spatial QCL relationship with either the PDCCH or a DMRS of the PDCCH, and attempting, by the UE, to detect the BQRS.

In a first implementation form of the method according to the second aspect as such, wherein there are multiple BQRSs and multiple BQRS-ON periods, wherein each BQRS-ON period is expected to include a BQRS, and wherein the computer-implemented method further comprises determining, by the UE, that the BQRS is absent during a BQRS-ON period, and based thereon, entering, by the UE, a non-power saving mode to perform beam recovery.

In a second implementation form of the method according to the second aspect as such or any preceding implementation form of the second aspect, the BQRS is sent only when the PDCCH is sent to the UE during an associated DRX-ON period, and wherein the computer-implemented method further comprises determining, by the UE, that the BQRS is present, and based thereon, detecting, by the UE, the PDCCH within the associated DRX-ON period.

In a third implementation form of the method according to the second aspect as such or any preceding implementation form of the second aspect, the BQRS includes a PDCCH indicator indicating if the PDCCH is sent to the UE during an associated DRX-ON period, and wherein the computer-implemented method further comprises determining, by the UE, that the BQRS detected includes the PDCCH indicator indicating that the PDCCH is sent to the UE during the associated DRX-ON period, and based thereon detecting, by the UE, the PDCCH during the associated DRX-ON period.

In a fourth implementation form of the method according to the second aspect as such or any preceding implementation form of the second aspect, the BQRS comprises at least one of a SSB, a CSI-RS, a DMRS, a DRS, or a reference signal dedicated for BQRS mode operation.

According to a third aspect, an access node is provided. The access node includes a non-transitory memory storage comprising instructions, and one or more processors in communication with the memory storage. The one or more processors execute the instructions to send to a UE configuration information for a BQRS that is associated with a DRX-ON period used for sending a PDCCH to the UE, wherein the BQRS has a spatial QCL relationship with either the PDCCH or a DMRS of the PDCCH, and send the BQRS to the UE.

In a first implementation form of the access node according to the third aspect as such, wherein there are multiple BQRSs, and wherein each of the multiple BQRSs is sent during a BQRS-ON period.

In a second implementation form of the access node according to the third aspect as such or any preceding implementation form of the third aspect, wherein there are multiple BQRS-ON periods during which the BQRS is transmitted, and wherein the BQRS is sent in a BQRS-ON period when the PDCCH is also sent to the UE in an associated DRX-ON period.

In a third implementation form of the access node according to the third aspect as such or any preceding implementation form of the third aspect, the PDCCH is sent to the UE within a specified number of DRX-ON periods after the BQRS is sent to the UE.

In a fourth implementation form of the access node according to the third aspect as such or any preceding implementation form of the third aspect, BQRS includes a PDCCH indicator indicating if the PDCCH is sent to the UE in an associated DRX-ON period.

In a fifth implementation form of the access node according to the third aspect as such or any preceding implementation form of the third aspect, one or more processors further execute the instructions to determine that no PDCCH is to be sent to the UE in the associated DRX-ON period, and based thereon sending a first BQRS to the UE, wherein the first BQRS is spatially QCL'ed with the PDCCH, had the PDCCH been sent to the UE in the associated DRX-ON period.

In a sixth implementation form of the access node according to the third aspect as such or any preceding implementation form of the third aspect, one or more processors further execute the instructions to determine that the PDCCH is to be sent to the UE in the associated DRX-ON period, and based thereon sending a second BQRS to the UE, wherein the second BQRS is spatially QCL'ed with the PDCCH to be sent to the UE in the associated DRX-ON period.

In a seventh implementation form of the access node according to the third aspect as such or any preceding implementation form of the third aspect, BQRS comprises at least one of a SSB, a CSI-RS, a DMRS, a DRS, or a reference signal dedicated for BQRS mode operation.

According to a fourth aspect, a user equipment (UE) is provided. The UE includes a non-transitory memory storage comprising instructions, and one or more processors in communication with the memory storage. The one or more processors execute the instructions to receive configuration information for a BQRS that is associated with a DRX-ON period used for receiving a PDCCH sent to the UE, wherein the BQRS has a spatial QCL relationship with either the PDCCH or a DMRS of the PDCCH, and attempt to detect the BQRS.

In a first implementation form of the UE according to the fourth aspect as such, there are multiple BQRSs and multiple BQRS-ON periods, wherein each BQRS-ON period is expected to include a BQRS, and wherein the one or more processors further execute the instructions to determine that the BQRS is absent during a BQRS-ON period, and based thereon, enter a non-power saving mode to perform beam recovery.

In a second implementation form of the UE according to the fourth aspect as such or any preceding implementation form of the fourth aspect, BQRS is sent only when the PDCCH is sent to the UE during an associated DRX-ON period, and wherein the one or more processors further execute the instructions to determine that the BQRS is present, and based thereon, detect the PDCCH within the associated DRX-ON period.

In a third implementation form of the UE according to the fourth aspect as such or any preceding implementation form of the fourth aspect, BQRS includes a PDCCH indicator indicating if the PDCCH is sent to the UE during an associated DRX-ON period, and wherein the one or more processors further execute the instructions to determine that the BQRS detected includes the PDCCH indicator indicating that the PDCCH is sent to the UE during the associated DRX-ON period, and based thereon detect the PDCCH during the associated DRX-ON period.

In a fourth implementation form of the UE according to the fourth aspect as such or any preceding implementation form of the fourth aspect, BQRS comprises at least one of a SSB, a CSI-RS, a DMRS, a DRS, or a reference signal dedicated for BQRS mode operation.

An advantage of a preferred embodiment is that a UE is able to rapidly determine if a control channel that it is monitoring has sufficient signal quality upon entering a DRX-ON period, thereby helping to reduce UE power consumption.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a diagram of an example prior art operation of PDCCH beam reception that becomes blocked during DRX operation;

FIG. 6 illustrates a diagram highlighting the use of a BQRS to ensure that a beam between access node and UE is intact according to example embodiments described herein;

FIG. 7A illustrates a flow diagram of example operations occurring in an access node configuring and transmitting BQRS according to example embodiments described herein;

FIGS. 7B-7D illustrate different example scenarios for BQRS transmission according to example embodiments described herein;

DETAILED DESCRIPTION OF ILLUSTRATIVE EMBODIMENTS

Figure 1:
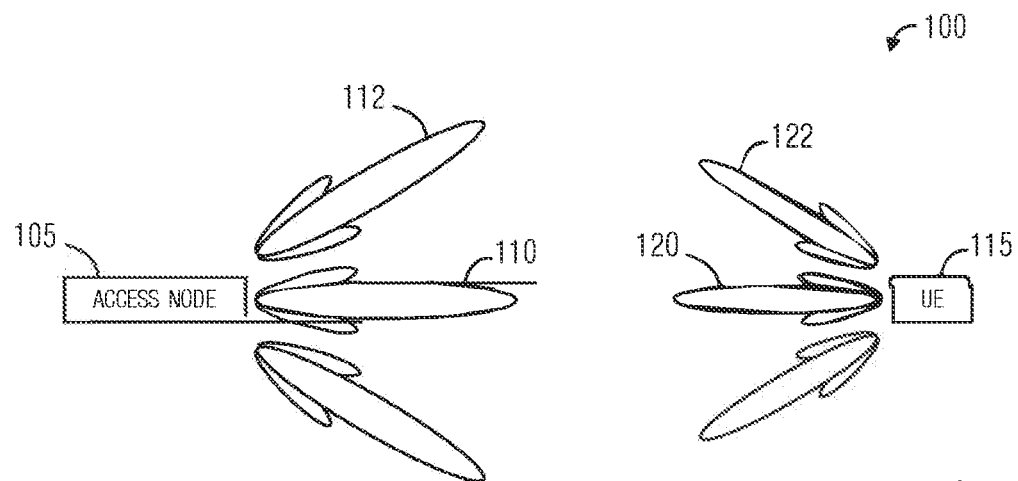
FIG. 1 illustrates an example wireless communications system.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB and one UE are illustrated for simplicity.

As discussed previously, pathloss in communications systems operating at high frequency (HF) (6 gigahertz (GHz) and above, such as millimeter wavelength (mm-Wave)) operating frequencies is high, and beamforming may be used to overcome the high pathloss. As shown in FIG. 1, both access node 105 and UE 115 communicate using beamformed transmissions and receptions. As an example, access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
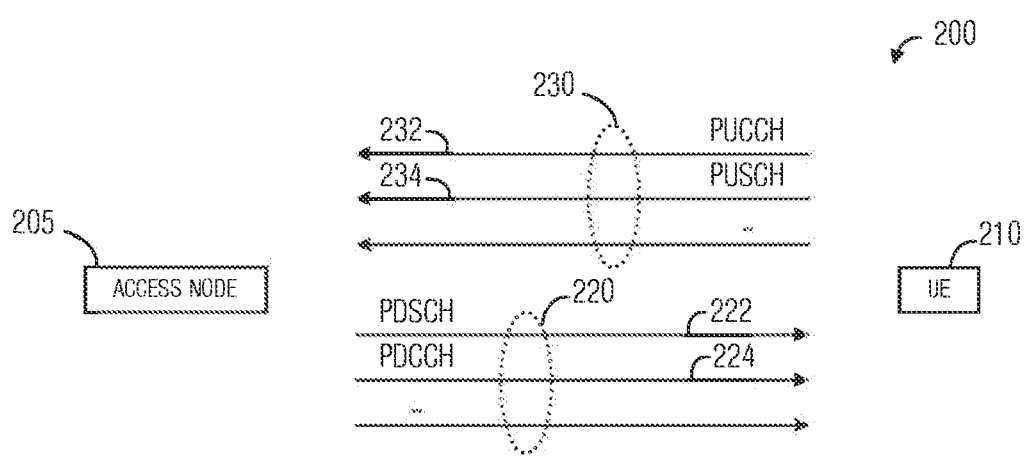
FIG. 2 illustrates a communications system 200 highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232, a physical uplink shared channel (PUSCH) 234, and a physical random access channel (PRACH) 236, among others. Other channels may be present in downlink channel 220 or uplink channel 230 but are not shown in FIG. 2.

Figure 3:
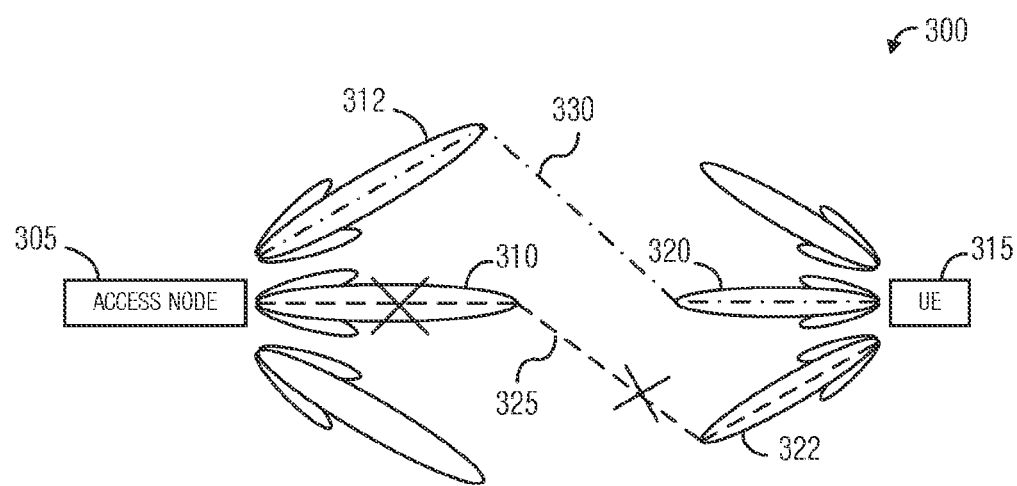
FIG. 3 illustrates a wireless communications system highlighting beam failure and beam failure recovery.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

When two or more reference signals, data signals, or resources are related in such a way that the two or more reference signals, data signals, or resources may be viewed as possessing similar characteristics, they are said to possess a quasi co-located (QCL) relationship or that they are QCL'ed. QCL relationships may refer to time, frequency, code, or spatial relationships between two or more reference signals, data signals, or resources, while spatial QCL refers to only spatial relationships between two or more reference signals, data signals, or resources. The spatial QCL information may include associations between signals and resources, such as channel status information-reference signal (CSI-RS) resources and wideband reference signals (WBRS), or associations between individual WBRSs, or associations between CSI-RS resources and beamformed random access channels (BRACHs). As an example, in a one to one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one to one association, each CSI-RS signal is associated with one WBRS. It is possible that multiple CSI-RS signals are associated with a single WBRS, and vice versa.

During the standardization activities of 3GPP Fifth Generation (5G) New Radio (NR), a Discontinuous Reception (DRX) operation mode is proposed for saving power consumption at the UE side. DRX operation mode is also sometimes referred to as connected mode discontinuous reception (C-DRX) operation mode. In DRX operation mode, a UE periodically wakes up in DRX-ON periods and performs PDCCH reception, and goes to sleep during DRX-OFF periods if no further action is dictated during the DRX-ON periods.

Figure 4A:
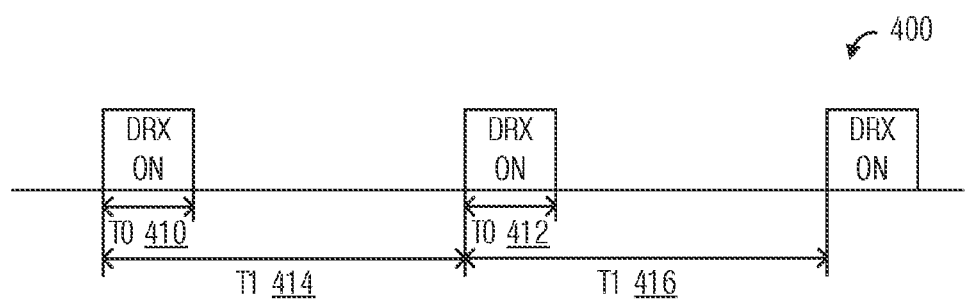
FIG. 4A illustrates a diagram of a first example of DRX operation, where only a Long DRX Cycle (drx-LongCycle) is configured and the serving access node does not send a PDCCH during a DRX-ON duration.

FIG. 4A illustrates a diagram 400 of a first example of DRX operation, where only a Long DRX Cycle (drx-LongCycle) is configured and the serving access node does not send a PDCCH during a DRX-ON duration. A UE switches its state between DRX-ON state and DRX-OFF state based on access node configuration. When the UE is in DRX-ON state, the UE monitors a wireless channel for a frame exchange. However, when the UE is in DRX-OFF state, the UE is not required to monitor the wireless channel based on the assumption that a serving access node will not initiate data transmission during the DRX-OFF state. For each long DRX cycle T1 414 and 416, the UE monitors PDCCH during T0 410 and 412 until a timer drx-onDurationTimer expires. After T0 410 and 412, when drx-onDurationTimer expires, the UE enters the DRX-OFF state again and is does not monitor the wireless channel. Therefore, during long DRX cycle T1 414 and 416, the UE only monitors the wireless channel during T0 410 and 412, which can save power consumption at the UE.

Figure 4B:
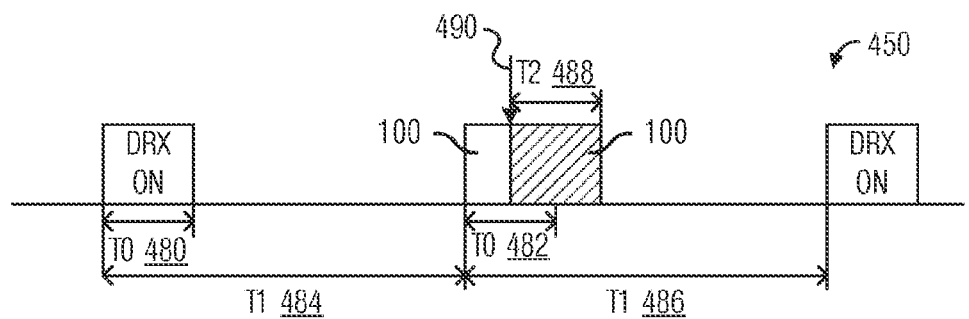
FIG. 4B illustrates a diagram of a second example of DRX operation, where only a long DRX Cycle (drx-LongCycle) is configured and the serving access node sends a PDCCH during a DRX-ON duration.

FIG. 4B illustrates a diagram 450 of a second example of DRX operation, where only a long DRX Cycle (drx-LongCycle) is configured and the serving access node sends a PDCCH during a DRX-ON duration. For each long DRX cycle T1 484 and 486, the UE monitors PDCCH during T0 480 and 482 until drx-onDurationTimer expires. If a PDCCH 490 is detected before drx-onDurationTimer expires, the UE monitors the wireless channel further during T2 488 until another timer (drx-InactivityTimer) expires to check for any follow up DL transmission. When drx-InactivityTimer expires and there is no follow up data exchange, then the UE enters the DRX-OFF state again and does not monitor the wireless channel.

With the DRX operation mode, a UE can avoid continuous PDCCH monitoring and as a result, save power. However, in 5G NR operation scenarios, especially when high frequency (e.g., above 6 GHz) bands are used for 5G NR communication, the wireless channel or beam can be blocked while the UE is not monitoring the PDCCH (i.e., while the UE is asleep in a DRX-OFF period) due to multiple reasons. For example, if a UE moves or changes its direction while the UE is not monitoring the PDCCH, or an object comes in between the UE and the access node, a transmit or receive beam may not be maintained because the wireless channel has changed.

FIG. 5 illustrates a diagram 500 of an example prior art operation of PDCCH beam reception that becomes blocked during DRX operation. In the example operation shown in FIG. 5, only a long DRX Cycle (drx-LongCycle) is configured for a UE, and the UE monitors for a PDCCH during DRX-ON durations or periods. For each DRX cycle T1 518, 520, and 522, the UE monitors for a PDCCH during DRX-ON periods at times T0 510, 512, and 514, and lasting until drx-onDurationTimer expires. As shown in FIG. 5, a beam used for PDCCH reception becomes blocked at time T2 530, while the UE is in the sleep state (in a DRX-OFF period).

During the DRX-OFF period, the UE does not identify (or is not able to identify) if the blocking of the beam used for PDCCH reception occurs.

Although the discussion presented herein focusses on the blocking of a single beam, beamformed communications in 5G NR typically uses two beams: a transmit beam at a transmitting device and a receive beam at a receiving device. These two beams are collectively referred to as a BPL. If either of the two beams (or both beams) of the BPL are blocked (or broken), then the BPL is blocked (or broken). Therefore, the discussion of the blocking of a single beam should not be construed as being limiting to either the scope or spirit of the example embodiments.

As the UE does not identify that the beam used for PDCCH reception has been blocked, the UE continues to use the beam for monitoring the PDCCH during upcoming DRX-ON periods at times T0 512 and 514. In this example, a serving access node transmits a series of PDCCHs to the UE at times T3 540 and T4 542, each within DRX-ON periods at times T0 512 and 514, respectively.

However, because of the blockage of the UE's beam used for PDCCH reception occurred at time T2 530, which is before time T0 512, the transmission of the PDCCH from the serving access node at times T3 540 and T4 542 are highly likely to be undetectable and undecodeable by the UE because the UE continues to use the same beam for PDCCH monitoring during DRX-ON periods at times T0 510, 512, and 514, even after the beam has been blocked.

Because the UE does not successfully decode any PDCCH destined for the UE during DRX-ON periods at times T0 510, 512, and 514, the UE goes back to the DRX-OFF state and stops monitoring the PDCCH. In this case, due to an instance of the blocking of the beam used for PDCCH reception, the UE does not receive any PDCCH for the entire time when the UE is in DRX operation, as shown in FIG. 5.

When a serving access node and a UE are operating in DRX mode, frame exchanges between the serving access node and the UE occur only within a DRX-ON period. No frame exchange is expected during a DRX-OFF period. Moreover in a normal operation scenario, the time duration of a DRX-OFF period is much longer than the time duration of a DRX-ON period to save more power at the UE. Therefore, if the blocking of the UE's beam used for PDCCH reception occurs, the impact of unsuccessfully receiving the PDCCH sent from the serving access node has a lasting impact on the performance of the UE, and thus, may result in radio link failure.

As such it is necessary for the UE to be able to confirm whether a beam used for detecting the PDCCH is still operable or not. In order to maximize DRX operating mode performance, it may be imperative that the UE is able to confirm the state of the beam as quickly as possible when it enters a DRX-ON period.

According to an example embodiment, a beam quality reference signal (BQRS) to assist in the confirmation of the quality of a beam used in detecting a downlink PDCCH is provided. A UE may detect the BQRS to ensure that the beam used in detecting the downlink PDCCH is intact. As an example, if the BQRS is detectable by the UE (and optionally with a signal quality that meets a quality threshold) then the beam may be deemed as having met a criterion for successful signal reception. As another example, if the BQRS is not detectable by the UE (and optionally with a signal quality that does not meet a quality threshold) then the beam may be deemed as having not met a criterion for successful signal reception.

In an embodiment, the BQRS is a dedicated reference signal for use in confirming the quality of the beam used in detecting the downlink PDCCH. However, other reference signals, such as a discontinuous reference signal (DRS), a synchronization signal block (SSB), a channel state information reference signal (CSI-RS), a demodulation reference signal (DMRS), and so on, may be used as a BQRS. In an embodiment, the BQRS is a cell-specific reference signal or a UE-specific reference signal. In the situation where the BQRS is a cell-specific reference signal, more than one UE may monitor the same BQRS to confirm if the quality of its own beam meets the criterion for successful signal reception. In an embodiment, the BQRS has a spatial QCL relationship with the PDCCH of the UE or another reference signal (such as a DMRS of the PDCCH of the UE). In other words, the BQRS and the PDCCH (or the DMRS of the PDCCH) are spatially QCL'ed. The PDCCH referred to herein is the PDCCH that the UE is going to monitor during the DRX-ON period. This ensures that by measuring the BQRS quality, the UE is able to infer the PDCCH reception quality.

In an embodiment, configuration information about the BQRS (or in general, a BQRS mode) is provided to the UE. The configuration information may be provided to the UE using higher layer signal, such as radio resource control (RRC) signaling, media access control (MAC) control element (CE) Messages, or downlink control information (DCI) messages. The configuration information may include time information, frequency information, or both time and frequency information, to inform the UE where to detect the BQRS when the UE wakes up. Alternatively, the configuration of the BQRS is specified by a technical standard or an operator of the communications system. In such a situation, the UE is programmed with the configuration information or is provided the configuration information by the communications system, such as during initial attachment or during a handover, for example.

FIG. 6 illustrates a diagram 600 highlighting the use of a BQRS to ensure that a beam between access node and UE is intact. The BQRS may be sent in a BQRS-ON period (T7 602 and 603, for example). During the BQRS-ON period, the UE is expected to wake up and monitor a reference signal quality of the BQRS. Examples of the reference signal quality include received signal power, reference signal received power (RSRP), reference signal received quality (RSRQ), signal to noise ratio (SNR), signal plus interference to noise ratio (SINR), block error rate (BLER), and so on. As shown in FIG. 6, the BQRS has a recurring periodicity of T6 601. However, the BQRS may be aperiodic. The position of each BQRS-ON period (e.g., T7 602 and 603), as well as associated starting and stopping positions, duration, and periodicity, of the BQRS may be configured by the access node. The BQRS-ON periods may or may not occur immediately before or after DRX-ON (such as T0 610, 612, 614, and 616) or DRX-OFF periods. Additionally, the BQRS-ON periods and the DRX-ON periods may overlap. Furthermore, a BQRS-ON period may be fully contained within a DRX-ON period or a DRX-ON period may be fully contained within a BQRS-ON period. Also, a BQRS-ON period and a DRX-ON period may be disjoint, and share no time in common. Also, one BQRS-ON period T7 602 may be followed by one (not illustrated in FIG. 6) or several (illustrated in FIG. 6) DRX-ON periods (such as T0 610, 612, and 614) until the next BQRS-ON period T7 603.

In general, a BQRS (or a BQRS-ON period) is associated with one or more DRX-ON periods. A BQRS (or a BQRS-ON period) is associated with the one or more DRX-ON periods that occur between consecutive BQRSs (or BQRS-ON periods). As an example, DRX-ON periods T0 610, 612, and 614, are associated with BQRS-ON period at time T7 602 or the BQRS transmitted therein.

The specifics of the BQRS-ON period (e.g., starting or ending positions in time or frequency, and duration) may be different from the specifics of the DRX-ON period, as illustrated in FIG. 6. The BQRS recurring periodicity may be different from the DRX recurring periodicity, as illustrated in FIG. 6, where three DRX periods T1 618, 620, 622 occur within a single BQRS period T6 601. However, they may be the same. Within each BQRS-ON period, there may be one or multiple BQRS configured.

The BQRS signal itself may be configured as having a QCL relationship with the PDCCH beam or a DMRS of the PDCCH beam, while the PDCCH for a particular UE may or may not occur within a particular DRX-ON period associated with the BQRS. The BQRS signal, on the other hand, will occur within a BQRS-ON period, although it is not necessary that the BQRS signal is present in every BQRS-ON period.

In an embodiment, UEs measure the BQRS during a BQRS-ON period. As a result, UE has knowledge if the beam used for PDCCH detection is intact. As an example, the UE has knowledge of the beam quality (e.g., RSRP, RSRQ, BLER, SINR, SNR, received signal power, and so forth) meeting a specified threshold. The threshold may be specified by a technical standard, set by an operator of the communications system, or determined by communications devices through collaboration. UE also monitors for potential PDCCH reception during DRX-ON period or periods associated with the BQRS or BQRS-ON period. Depending on the BQRS-ON monitoring results and DRX-ON monitoring results, there may be four possibilities, which can be categorized into two scenarios.

Scenario 1: If the last m>=1 (including the current) BQRS-ON periods yielded a beam quality of a beam used for BQRS detection that is consistently worse than a first threshold, AND that the latest n>=1 (including the current) DRX-ON periods yielded no PDCCH reception as a result of PDCCH detections, the UE may abort reception of DRX-ON periods afterwards. However, the UE may still monitor BQRS-ON periods afterwards. Once a BQRS in a new BQRS-ON period is received with a beam quality that meets a second threshold, the UE may continue (or resume) to perform PDCCH detections during the DRX-ON periods associated with the BQRS again. The first and second thresholds may be the same or they may be different. The UE still sleeps during the DRX-OFF periods afterwards. In an embodiment, the UE aborting reception means that UE breaks out of the DRX mode entirely and enters non-DRX mode for recovery, possibly by performing a link recovery procedure or beam failure recovery procedure as defined in 3GPP specification. Non-DRX mode may be referred to as non-power saving mode. In another embodiment, the UE simply sleeps during the DRX-ON and may resume DRX mode at a later point, e.g., when BQRS is received again.

Scenario 2: otherwise. This means that during the last m>=1 BQRS-ON periods, at least one beam quality of a beam used for BQRS detection is better than a threshold, OR that during the last n>=1 DRX-ON periods, at least one PDCCH is received successfully, OR both conditions are met. In this scenario, the UE should continue to monitor BQRS-ON periods and DRX-ON periods as usual. The UE should still sleep during the DRX-OFF periods afterwards.

In the above scenarios, the values m and n may be greater than or equal to 1. The values m and n may be the same or they may be different from each other.

Overall, from the access node side, the access node configures BQRS-ON periods in addition to DRX-ON or DRX-OFF periods. From UE side, the UE monitors BQRS-ON periods in addition to DRX-ON periods. UE does not need to monitor DRX-OFF periods. Depending on the results of monitoring BQRS-ON and DRX-ON periods in the past, the UE behavior for the upcoming BQRS-ON or DRX-ON periods may be impacted.

In an embodiment, a BQRS-ON period and a DRX-ON period may be combined into one unified period. In another embodiment, the BQRS may not be always transmitted in every BQRS-ON period by an access node. The BQRS may be transmitted by an access node to a particular UE (in this case, the BQRS is a UE-specific RS) in a BQRS-ON period only if there is PDCCH intended for that particular UE in an associated DRX-ON. As used in this discussion, a DRX-ON period is deemed to be associated with a BQRS-ON period if it occurs within N DRX-ON periods after the BQRS-ON period, where N is a positive integer value. Additionally, the one or more DRX-ON periods between successive BQRSs (or BQRS-ON periods) may be associated with the earlier of the two successive BQRSs (or BQRS-ON periods). The association conveys a general idea of closeness between the two periods. In the prior art, even though a UE checks each and every DRX-ON period for a PDCCH, the access node may or may not send a PDCCH to this UE in any particular DRX-ON period. In other words, access node selectively sends out the BQRS based on presence of PDCCH. If PDCCH is being transmitted to a UE, then the access node should include the BQRS nearby (e.g., prior to the DRX-ON period, after the DRX-ON period, or in the same duration as the DRX-ON). Otherwise, access node does not send a BQRS to this UE. It is important that the BQRS is spatially QCL'ed with the PDCCH or the DMRS of the PDCCH that the UE is going to monitor.

At the UE side, the UE first tries to receive a BQRS when it wakes up. If it does not receive a BQRS with sufficient beam quality, the UE may stop PDCCH searches all together. This helps UE to further reduce power when BQRS beam quality is poor. In this case, the BQRS serves several purposes: a) it allows the UE to detect if the PDCCH beam is of significant quality and proceed to receive PDCCH; b) it serves as a flag to the UE that a PDCCH is being sent to this UE. In an alternative embodiment, the UE may not stop PDCCH searches.

In an embodiment, a BQRS is transmitted in each BQRS-ON period. A BQRS is transmitted in each BQRS-ON period, independent of whether or not there is a PDCCH intended for the UE in an associated DRX-ON period. In this situation, the BQRS may be used for the detection of possible beam failures. As an example, if a BQRS is not received successfully during a BQRS-ON period, a beam failure may have occurred. In a first example scenario, the UE may enter the sleep mode for the remaining DRX window, and trigger a link recovery procedure or a beam failure recovery procedure whenever possible. Entering into the sleep mode may result in the UE missing the reception of one or more PDCCHs. In a second example scenario, the UE stays in DRX mode, and continues monitoring BQRS-ON periods but skips PDCCH monitoring in DRX-ON periods. The UE may resume monitoring DRX-ON periods if a new BQRS is received with beam quality meeting a specified threshold. As an example of the second scenario, if the UE receives a new BQRS with a beam quality that exceeds a first threshold, then the UE performs a first operation (such as, resume PDCCH monitoring in DRX-ON periods, or not resume PDCCH monitoring in DRX-ON periods), if the beam quality does not exceed a second threshold, then the UE performs a second operation, or if the beam quality is between the first threshold and the second threshold, the UE performs a third operation. The different operations (the first, second, and third operations) may differ depending on beam quality. In a third example scenario, the UE remains in the DRX mode and continues to monitor DRX-ON and DRX-ON periods, the UE may resume if either a new BQRS is received with sufficient beam quality or a new PDCCH is received successfully. Other example scenarios are possible.

In an embodiment, a BQRS is transmitted in a BQRS-ON period only if there is a PDCCH intended for the UE. In other words, a BQRS is transmitted in a BQRS-ON period only when there is a PDCCH for the UE in a DRX-ON period associated with the BQRS-ON period. Otherwise, the access node does not transmit a BQRS to the UE. Therefore, if there is a PDCCH being transmitted to the UE, the access node will also send a BQRS to the UE. The BQRS may be sent earlier than the PDCCH or in front of the PDCCH. At the UE, if the UE receives a BQRS in a BQRS-ON period, the UE will continue with PDCCH detection. However, if the UE does not receive a BQRS in a BQRS-ON period, the UE will not perform PDCCH detection or stop PDCCH detection if it has already started PDCCH detection. In this embodiment, the presence of the BQRS allows the UE to determine that the beam used for PDCCH detection has sufficient quality (i.e., meets the criterion for successful signal reception) and proceed with PDCCH detection. The BQRS also serves as a flag indicating to the UE that there is a PDCCH for the UE. The flag may be referred to as a PDCCH indicator.

In an embodiment, different BQRS sequences are available for transmission in order to convey information. Different BQRS sequences are available for transmission in order to convey $Log_2 N$ bits of information, where N is the number of BQRS sequences. As an example, two different BQRS sequences are available for transmission to convey 1 bit of information. When a first BQRS sequence is transmitted in a BQRS-ON period, the first BQRS sequence may be used by the UE to check beam quality and to convey to the UE that there is no PDCCH intended for it in a DRX-ON period associated with the BQRS-ON period. When a second BQRS sequence is transmitted in the BQRS-ON period, the second BQRS sequence may be used by the UE to check beam quality and to convey to the UE that there is a PDCCH intended for it in a DRX-ON period associated with the BQRS-ON period. In other words, the two BQRS sequences are used instead of the presence or absence of a BQRS.

FIG. 7A illustrates a flow diagram of example operations 700 occurring in an access node configuring and transmitting B QRS. Operations 700 may be indicative of operations occurring in an access node as the access node configures and transmits BQRS.

Operations 700 begin with the access node configuring a BQRS, BQRS-ON periods, and a DRX mode (block 705). Configuring the BQRS may include the specification of one or more sequences used as the BQRS, network resources that will convey the BQRS, encoding, scrambling, cell-specific or UE-specific, etc. Configuring the BQRS-ON periods may include the specification of start time, stop time, start time and duration, and so on. Configuring the DRX mode may include the specification of DRX-ON start time, stop time, start time and duration, DRX period duration, and so on. The access node sends the configurations (block 707). The access node sends the BQRS (block 709). The access node may send the BQRS every BQRS-ON period, or send the BQRS only when there is a PDCCH intended for the UE in an associated DRX-ON period. The access node may select a particular BQRS sequence out of multiple BQRS sequences to convey additional information. The access node sends a PDCCH (block 711).

FIGS. 7B-7D illustrate different example scenarios for BQRS transmission. A BQRS may be sent every configured BQRS-ON period (block 720 of FIG. 7B). A BQRS may be sent in a BQRS-ON period only when there is a PDCCH intended for the UE in a DRX-ON period associated with the BQRS-ON period (block 730 of FIG. 7C). A BQRS is always sent, but a first BQRS is sent when there is no PDCCH for the UE in an associated DRX-ON period or a second BQRS is sent when there is a PDCCH for the UE in an associated DRX-ON period (block 740 of FIG. 7D).

Figures 8A, 8B:
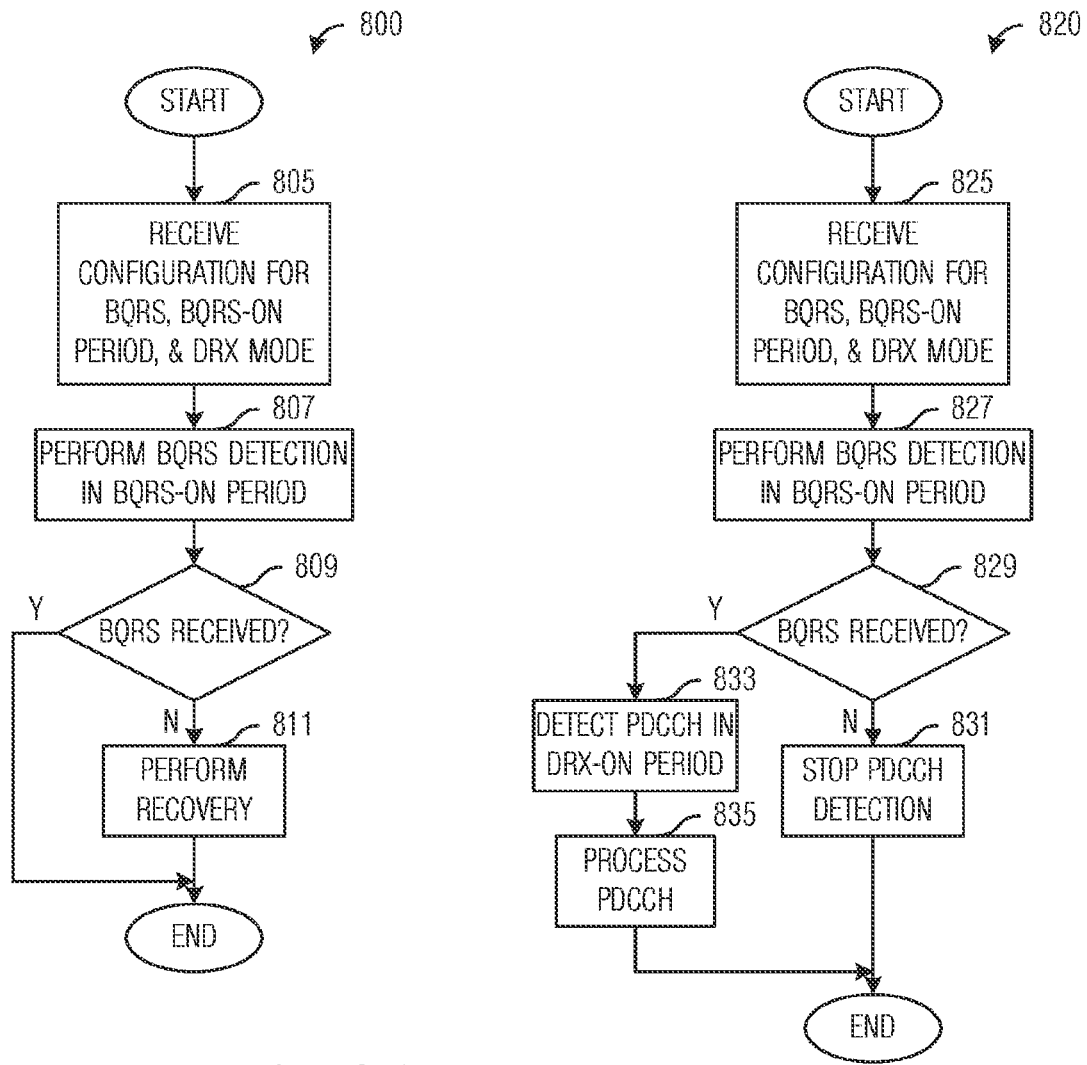
FIG. 8A illustrates a flow diagram of example operations occurring in a UE highlighting a situation where a BQRS is transmitted in every BQRS-ON period according to example embodiments described herein.
FIG. 8B illustrates a flow diagram of example operations occurring in a UE highlighting a situation where a BQRS is transmitted in a BQRS-ON period only if there is a PDCCH intended for the UE in an associated DRX-ON period according to example embodiments described herein.

FIG. 8A illustrates a flow diagram of example operations 800 occurring in a UE highlighting a situation where a BQRS is transmitted in every BQRS-ON period. Operations 800 may be indicative of operations occurring in a UE as the UE receives BQRSs when a BQRS is transmitted in every BQRS-ON period.

Operations 800 begin with the UE receiving a configuration for a BQRS, BQRS-ON periods, and a DRX mode (block 805). The UE performs BQRS detection in a BQRS-ON period (block 807). The UE performs a check to determine if a BQRS has been received (block 809). The check to determine if a BQRS has been received may be a check to determine if a BQRS has been received or it may be a check to determine if a BQRS has been received with a beam quality that meets a specified threshold, for example. If a BQRS has been received in the BQRS-ON period, then operations 800 end. If a BQRS has not been received in the BQRS-ON period, the UE performs recovery (block 811). Recovery may include the UE exiting DRX mode and triggering a link recovery procedure or a beam failure recovery procedure. Recovery may include the UE entering the sleep mode for the remaining DRX window and trigger a link recovery procedure or a beam failure recovery procedure when possible. Recovery may include the UE staying in DRX mode and continuing the monitoring of BQRS-ON periods but skipping PDCCH monitoring in DRX-ON periods; and the UE may resume monitoring DRX-ON periods if a new BQRS is received with beam quality meeting a specified threshold. Recovery may include the UE remaining in the DRX mode and continuing to monitor DRX-ON and DRX-ON periods, the UE may resume if either a new BQRS is received with sufficient beam quality or a new PDCCH is received successfully. Other recovery procedures are possible.

FIG. 8B illustrates a flow diagram of example operations 820 occurring in a UE highlighting a situation where a BQRS is transmitted in a BQRS-ON period only if there is a PDCCH intended for the UE in an associated DRX-ON period. Operations 820 may be indicative of operations occurring in a UE as the UE receives BQRSs when a BQRS is transmitted in a BQRS-ON period only if there is a PDCCH intended for the UE in an associated DRX-ON period.

Operations 820 begin with the UE receiving a configuration for a BQRS, BQRS-ON periods, and a DRX mode (block 825). The UE performs BQRS detection in a BQRS-ON period (block 827). The UE performs a check to determine if a BQRS has been received (block 829). If the BQRS has not been received, the UE stops PDCCH detection (block 831). If the BQRS has been received, the UE performs PDCCH detection in associated DRX-ON periods (block 833). When a PDCCH is received, the UE processes the PDCCH (block 835).

Figure 8C:
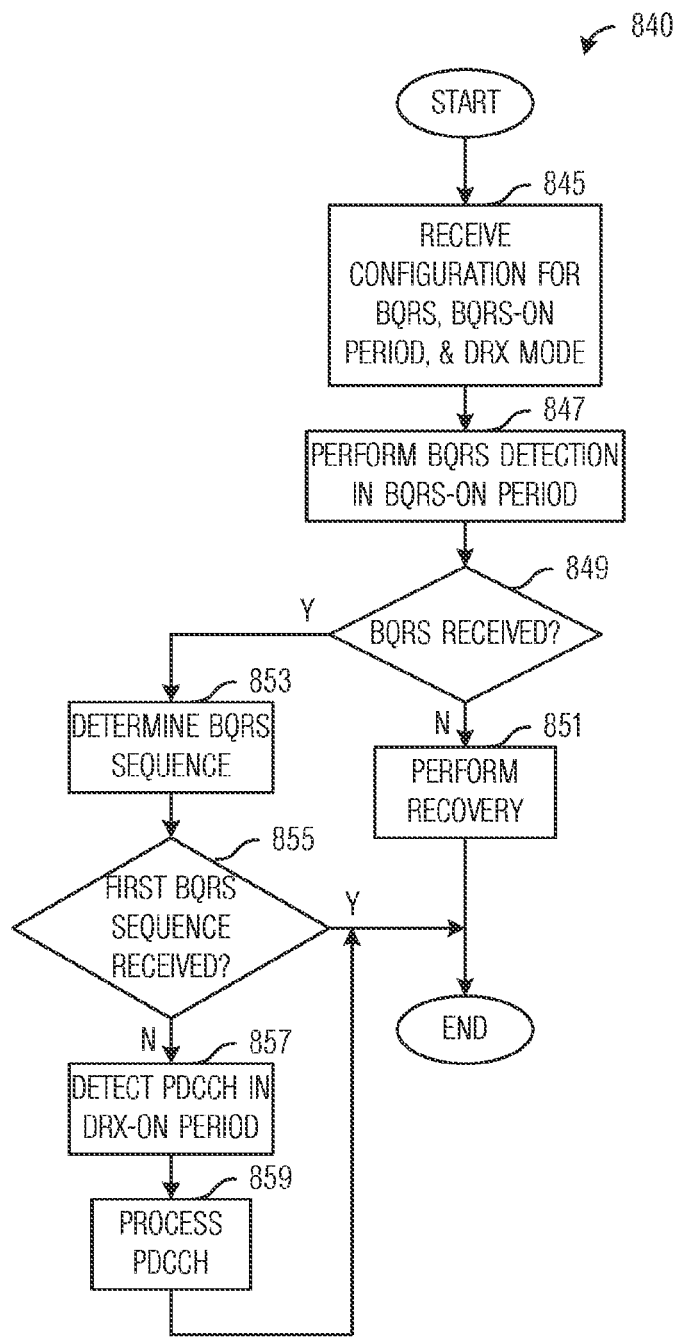
FIG. 8C illustrates a flow diagram of example operations occurring in a UE highlighting a situation where multiple BQRS sequences are transmitted to convey information according to example embodiments described herein.

FIG. 8C illustrates a flow diagram of example operations 840 occurring in a UE highlighting a situation where multiple BQRS sequences are transmitted to convey information. Operations 840 may be indicative of operations occurring in a UE as the UE receives BQRSs when multiple BQRS sequences are transmitted to convey information.

Operations 840 begin with the UE receiving a configuration for a BQRS, BQRS-ON periods, and a DRX mode (block 845). The UE performs BQRS detection in a BQRS-ON period (block 847). The UE performs a check to determine if a BQRS has been received (block 849). If the BQRS has not been received, the UE performs recovery (block 851). If the BQRS has been received, the UE determines the BQRS sequence received (block 853). The UE performs a check to determine if a first BQRS sequence has been received (block 855). If the first BQRS sequence has been received, operations 840 end. If the first BQRS sequence has not been received, the UE performs PDCCH detection in associated DRX-ON periods (block 857). When a PDCCH is received, the UE processes the PDCCH (block 859).

Figure 9:
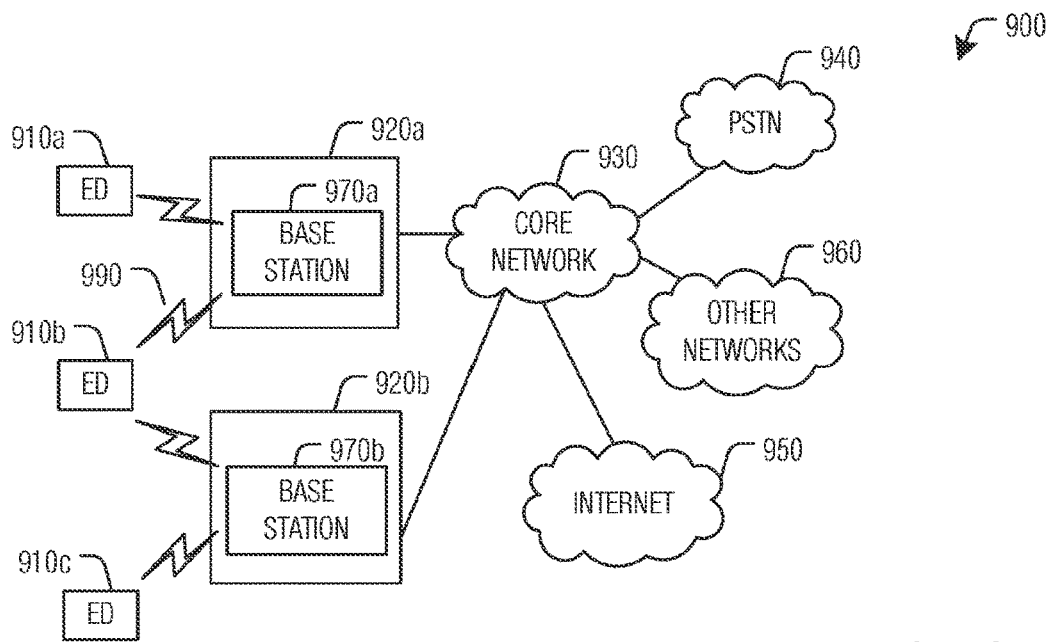
FIG. 9 illustrates an example communication system according to example embodiments described herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, or the other networks 960. For example, the base stations 970a-970b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 910a-910c are configured to interface and communicate with the Internet 950 and may access the core network 930, the PSTN 940, or the other networks 960.

In the embodiment shown in FIG. 9, the base station 970a forms part of the RAN 920a, which may include other base stations, elements, or devices. Also, the base station 970b forms part of the RAN 920b, which may include other base stations, elements, or devices. Each base station 970a-970b operates to transmit or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910a-910c may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
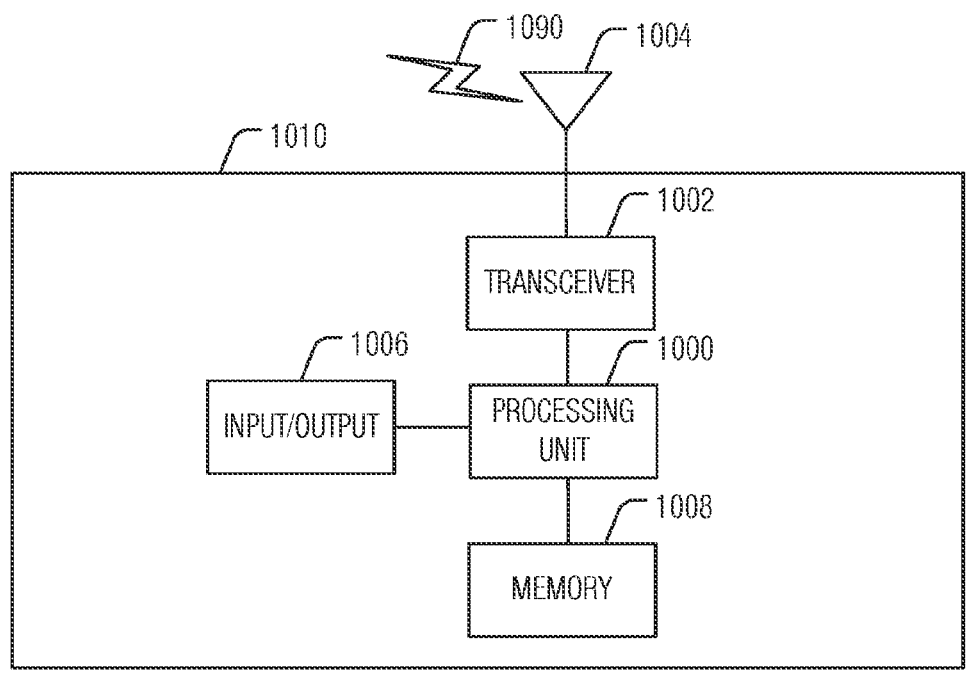
FIGS. 10A and 10B illustrate example devices that may implement the methods and teachings according to this disclosure.
Figure 10B:
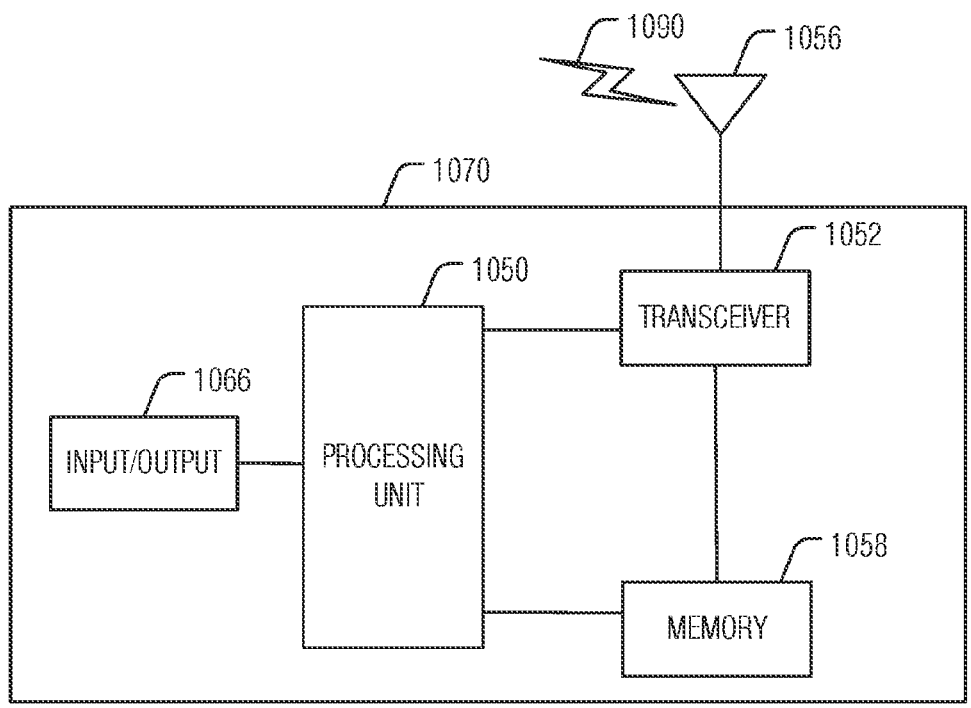

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
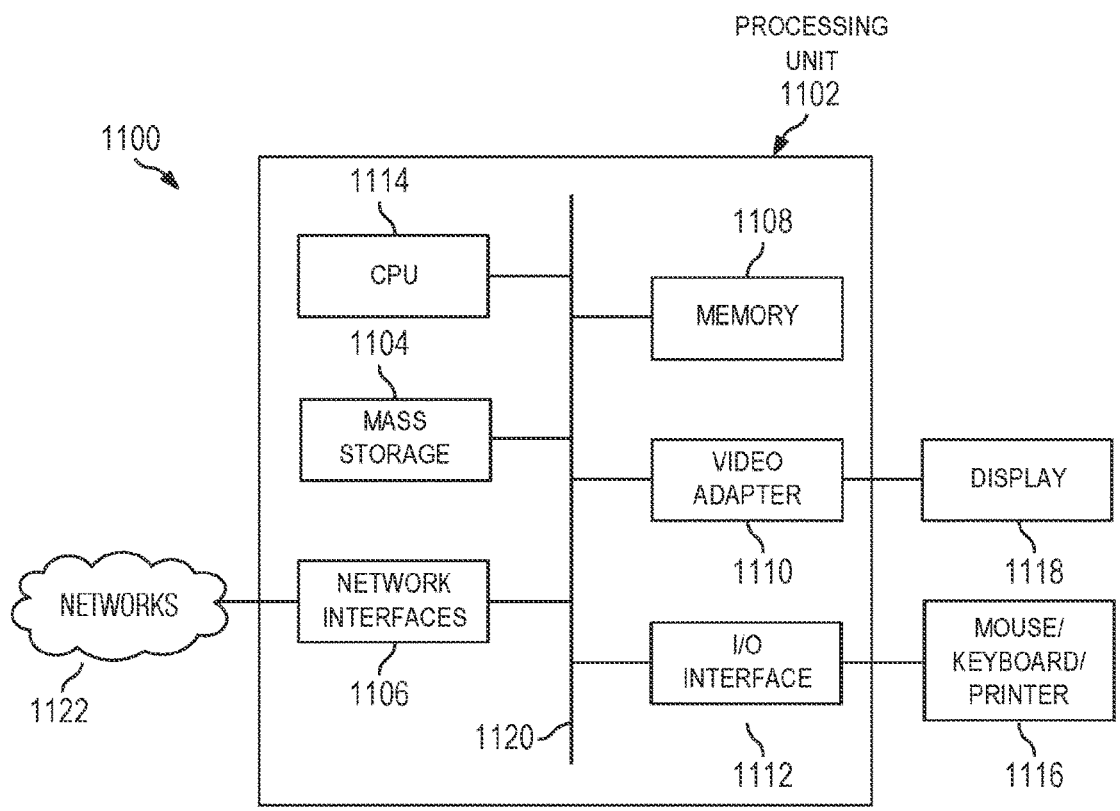
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse, keyboard, or printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, or a detecting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer-implemented method comprising:
sending, by an access node, to a user equipment (UE) configuration information for a beam quality reference signal (BQRS) that is associated with a discontinuous reception (DRX)-ON period used for sending a physical downlink control channel (PDCCH) to the UE, wherein the BQRS has a spatial quasi-collocated (QCL) relationship with either the PDCCH or a demodulation reference signal (DMRS) of the PDCCH; and
sending, by the access node, the BQRS to the UE.

2. The computer-implemented method of claim 1, wherein there are multiple BQRSs, and wherein each of the multiple BQRSs is sent during a BQRS-ON period.

3. The computer-implemented method of claim 1, wherein the BQRS is a UE-specific reference signal.

4. The computer-implemented method of claim 1, wherein the BQRS is a cell-specific reference signal.

5. The computer-implemented method of claim 1, wherein there are multiple BQRS-ON periods during which the BQRS is transmitted, and wherein the BQRS is sent in a BQRS-ON period when the PDCCH is also sent to the UE in the DRX-ON period associated with the BQRS.

6. The computer-implemented method of claim 1, wherein the PDCCH is sent to the UE within a specified number of DRX-ON periods after the BQRS is sent to the UE.

7. The computer-implemented method of claim 1, wherein the BQRS includes a PDCCH indicator indicating if the PDCCH is sent to the UE in the DRX-ON period associated with the BQRS.

8. The computer-implemented method of claim 1, wherein sending the BQRS comprises:
determining, by the access node, that no PDCCH is to be sent to the UE in the DRX-ON period associated with the BQRS, and based thereon sending, by the access node, a first BQRS to the UE, wherein the first BQRS is spatially QCL'ed with the PDCCH, had the PDCCH been sent to the UE in the DRX-ON period associated with the BQRS.

9. The computer-implemented method of claim 1, wherein sending the BQRS comprises:
determining, by the access node, that the PDCCH is to be sent to the UE in the DRX-ON period associated with the BQRS, and based thereon sending, by the access node, a second BQRS to the UE, wherein the second BQRS is spatially QCL'ed with the PDCCH to be sent to the UE in the DRX-ON period associated with the BQRS.

10. The computer-implemented method of claim 1, wherein there are multiple DRX-ON periods during which the PDCCH is sent to the UE, wherein the BQRS is transmitted during a BQRS-ON period, and wherein the BQRS-ON period is disjoint from the multiple DRX-ON periods such that there is no time shared between the BQRS-ON period and the multiple DRX-ON periods.

11. The computer-implemented method of claim 1, wherein the BQRS is associated with at most one DRX-ON period.

12. The computer-implemented method of claim 1, wherein there are multiple DRX-ON periods during which the PDCCH is sent to the UE, wherein the BQRS is transmitted during a BQRS-ON period, and wherein the BQRS-ON period overlaps at least one DRX-ON period.

13. A computer-implemented method comprising:
receiving, by a user equipment (UE), configuration information for a beam quality reference signal (BQRS) that is associated with a discontinuous reception (DRX)-ON period used for receiving a physical downlink control channel (PDCCH) sent to the UE, wherein the BQRS has a spatial quasi-collocated (QCL) relationship with either the PDCCH or a demodulation reference signal (DMRS) of the PDCCH; and
attempting, by the UE, to detect the BQRS based upon the configuration information.

14. The computer-implemented method of claim 13, wherein there are multiple BQRSs and multiple BQRS-ON periods, wherein each BQRS-ON period is expected to include a corresponding BQRS, and wherein the computer-implemented method further comprises determining, by the UE, that a signal quality of the BQRS is less than a threshold during a BQRS-ON period, and based thereon, entering, by the UE, a non-power saving mode to perform beam recovery.

15. The computer-implemented method of claim 13, wherein the computer-implemented method further comprises determining, by the UE, that the BQRS is present, and based thereon, detecting, by the UE, the PDCCH within the DRX-ON period associated with the BQRS.

16. The computer-implemented method of claim 13, wherein the BQRS includes a PDCCH indicator indicating if the PDCCH is sent to the UE during the DRX-ON period associated with the BQRS, and wherein the computer-implemented method further comprises determining, by the UE, that the BQRS detected includes the PDCCH indicator indicating that the PDCCH is sent to the UE during the DRX-ON period associated with the BQRS, and based thereon detecting, by the UE, the PDCCH during the DRX-ON period associated with the BQRS.

17. The computer-implemented method of claim 13, wherein the BQRS comprises at least one of a synchronization signal block (SSB), a channel state information reference signal (CSI-RS), the DMRS, a discontinuous reference signal (DRS), or a reference signal dedicated for BQRS mode operation.

18. An access node comprising:
a non-transitory memory storage comprising instructions; and
one or more processors in communication with the non-transitory memory storage, wherein the one or more processors execute the instructions to:
send to a user equipment (UE) configuration information for a beam quality reference signal (BQRS) that is associated with a discontinuous reception (DRX)-ON period used for sending a physical downlink control channel (PDCCH) to the UE, wherein the BQRS has a spatial quasi-collocated (QCL) relationship with either the PDCCH or a demodulation reference signal (DMRS) of the PDCCH, and
send the BQRS to the UE.

19. The access node of claim 18, wherein there are multiple BQRSs, and wherein each of the multiple BQRSs is sent during a BQRS-ON period.

20. The access node of claim 18, wherein there are multiple BQRS-ON periods during which the BQRS is transmitted, and wherein the BQRS is sent in a BQRS-ON period when the PDCCH is also sent to the UE in the DRX-ON period associated with the BQRS.

21. The access node of claim 18, wherein the PDCCH is sent to the UE within a specified number of DRX-ON periods after the BQRS is sent to the UE.

22. The access node of claim 18, wherein the BQRS includes a PDCCH indicator indicating if the PDCCH is sent to the UE in the DRX-ON period associated with the BQRS.

23. The access node of claim 18, wherein the one or more processors further execute the instructions to determine that no PDCCH is to be sent to the UE in the DRX-ON period associated with the BQRS, and based thereon sending a first BQRS to the UE, wherein the first BQRS is spatially QCL'ed with the PDCCH, had the PDCCH been sent to the UE in the DRX-ON period associated with the BQRS.

24. The access node of claim 18, wherein the one or more processors further execute the instructions to determine that the PDCCH is to be sent to the UE in the DRX-ON period associated with the BQRS, and based thereon sending a second BQRS to the UE, wherein the second BQRS is spatially QCL'ed with the PDCCH to be sent to the UE in the DRX-ON period associated with the BQRS.

25. The access node of claim 18, wherein the BQRS comprises at least one of a synchronization signal block (SSB), a channel state information reference signal (CSI-RS), the DMRS, a discontinuous reference signal (DRS), or a reference signal dedicated for BQRS mode operation.

26. A user equipment (UE) comprising:
a non-transitory memory storage comprising instructions; and
one or more processors in communication with the non-transitory memory storage, wherein the one or more processors execute the instructions to:
receive configuration information for a beam quality reference signal (BQRS) that is associated with a discontinuous reception (DRX)-ON period used for receiving a physical downlink control channel (PDCCH) sent to the UE, wherein the BQRS has a spatial quasi-collocated (QCL) relationship with either the PDCCH or a demodulation reference signal (DMRS) of the PDCCH, and
attempt to detect the BQRS based upon the configuration information.

27. The UE of claim 26, wherein there are multiple BQRSs and multiple BQRS-ON periods, wherein each BQRS-ON period is expected to include a corresponding BQRS, and wherein the one or more processors further execute the instructions to determine that a signal quality of the BQRS is less than a threshold during a BQRS-ON period, and based thereon, enter a non-power saving mode to perform beam recovery.

28. The UE of claim 26, wherein the BQRS is sent only when the PDCCH is sent to the UE during the DRX-ON period associated with the BQRS, and wherein the one or more processors further execute the instructions to determine that the BQRS is present, and based thereon, detect the PDCCH within the DRX-ON period associated with the BQRS.

29. The UE of claim 26, wherein the BQRS includes a PDCCH indicator indicating if the PDCCH is sent to the UE during the DRX-ON period associated with the BQRS, and wherein the one or more processors further execute the instructions to determine that the BQRS detected includes the PDCCH indicator indicating that the PDCCH is sent to the UE during the DRX-ON period associated with the BQRS, and based thereon detect the PDCCH during the DRX-ON period associated with the BQRS.

* * * * *